March 2, 1965     M. BENTELE ETAL     3,171,590
OIL SEAL CONSTRUCTION FOR ROTARY COMBUSTION ENGINES
Filed Dec. 16, 1960     5 Sheets-Sheet 1

INVENTORS
WILLIAM J. DERNER
MAX BENTELE
BY
*Morgan, Finnegan, Durham & Pine*
ATTORNEYS INVENTORS
WILLIAM J. DERNER
MAX BENTELE
BY
Morgan, Finnegan, Durham & Pine
ATTORNEYS March 2, 1965    M. BENTELE ETAL    3,171,590
OIL SEAL CONSTRUCTION FOR ROTARY COMBUSTION ENGINES
Filed Dec. 16, 1960    5 Sheets-Sheet 5
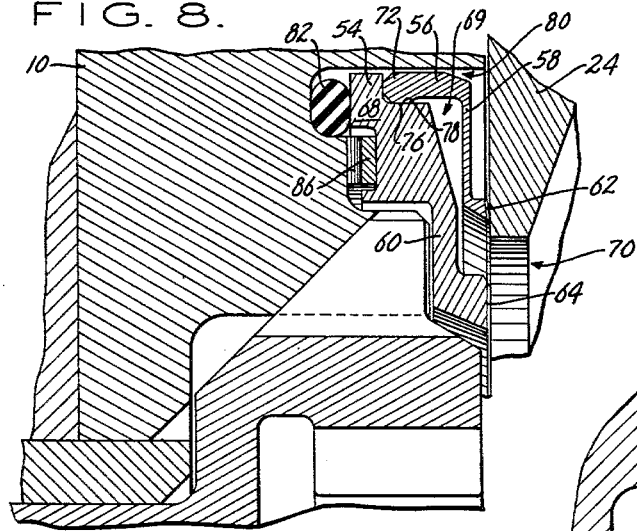
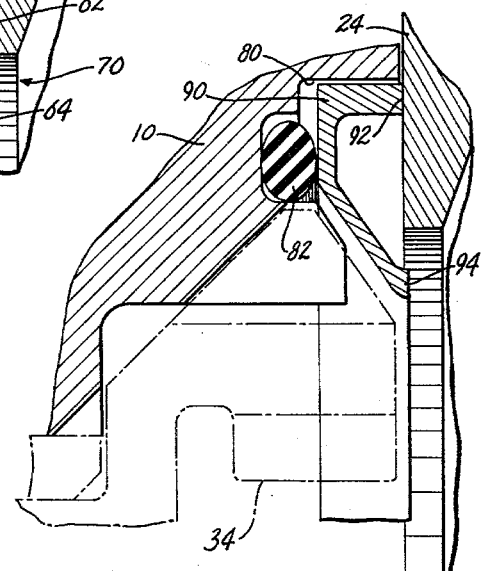
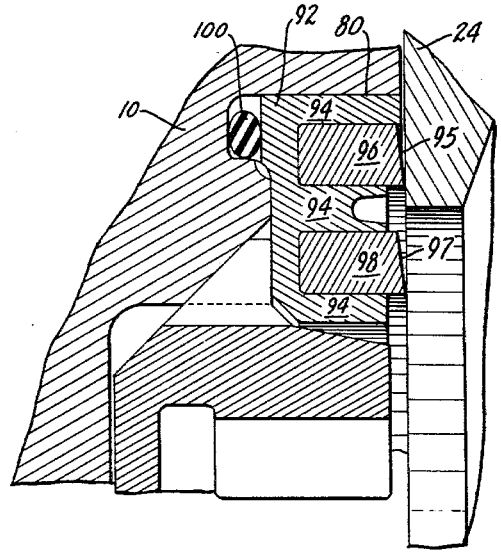
INVENTORS
WILLIAM J. DERNER
MAX BENTELE
BY
Morgan, Finnegan, Durham & Pine
ATTORNEYS

United States Patent Office 3,171,590
Patented Mar. 2, 1965

3,171,590
OIL SEAL CONSTRUCTION FOR ROTARY
COMBUSTION ENGINES
Max Bentele, Ridgewood, and William J. Derner, Wyckoff,
N.J., assignors to Curtiss-Wright Corporation, a corporation of Delaware
Filed Dec. 16, 1960, Ser. No. 76,173
18 Claims. (Cl. 230—207)

This invention relates to sealing means for rotary mechanisms and more particularly to an oil sealing means which improves the sealing characteristics of the mechanism and helps insure relatively trouble-free, smooth functioning of the seal. More particularly the present invention relates to a novel oil sealing means which automatically maintains oil sealing contact with an adjacent member.

Although this invention is applicable to and useful in almost any type of rotary mechanism which presents a sealing requirement, such as combustion engines, fluid motors, fluid pumps, compressors, and the like, it is particularly useful in rotating combustion engines. To simplify and clarify the explanation of the invention, the description which follows will, for the most part, be restricted to the use of the invention in a rotating combustion engine. It will be apparent from the description, however, that with slight modifications which would be obvious to a person skilled in the art, the invention is equally applicable to other types of rotary mechanisms.

The present invention is particularly useful in rotary mechanisms of the type which comprise an outer body having an axis, axially-spaced end walls, and a peripheral wall interconnecting the end walls. In such rotary mechanisms the inner surfaces of the peripheral wall and end walls form a cavity, and the mechanism also includes an inner body or rotor which is mounted within the cavity between its end walls.

The axis of the inner body or rotor is eccentric from and parallel to the axis of the cavity of the outer body, and the rotor has axially-spaced end faces disposed adjacent to the end walls of the outer body, and a plurality of circumferentially-spaced apex portions. The rotor is rotatable relative to the outer body, and its apex portions substantially continuously engage the inner surface of the outer body to form a plurality of working chambers which vary in volume during engine operation, as a result of relative rotation between the rotor and outer body.

The inner surface of the peripheral wall of the outer body has a multi-lobed profile which is preferably an epitrochoid and the number of lobes of this epitrochoid is one less than the number of apex portions of the inner body or rotor.

By suitable arrangement of ports, such rotary mechanisms may be used as fluid motors, compressors, fluid pumps, or internal combustion engines. The invention is of particular importance when employed with a rotary mechanism which is designed for use with a gaseous working medium. The invention, accordingly will be described in combination with a rotating combustion engine. As the description proceeds, however, it will be apparent that the invention is not limited to this specific application.

When the rotary mechanism is designed for use as a rotating combustion engine, such engines also include an intake passage means for administering a fuel-air mixture to the variable volume working chambers, an exhaust passage means communicating with the working chambers, and suitable ignition means so that during engine operation the working chambers of the engine undergo a cycle of operation which includes the four phases of intake, compression, expansion, and exhaust. This cycle of operation is achieved as a result of the relative rotation of the inner body or rotor and outer body and for this purpose both the inner body or rotor and outer body may rotate at different speeds, but preferably the inner body or rotor rotates while the outer body is stationary.

For efficient operation of the engine, its working chambers should be sealed, and, therefore, an effective gas seal is provided between each rotor apex portion and the inner surface of the peripheral wall of the outer body, as well as between the end faces of the rotor and the inner surfaces of the end walls of the outer body.

Between the apex portions of its outer surface the rotor has a contour which permits its rotation relative to the outer body free of mechanical interference with the multi-lobed inner surface of the outer body. The maximum profile which the outer surface of the rotor can have between its apex portions and still be free to rotate without interference is known as the "inner envelope" of the multi-lobed inner surface, and the profile of the rotor which is illustrated in the accompanying drawings approximates this "inner envelope."

For the purposes of illustration, the following description will be related to the present preferred embodiment of the engine in which the inner surface of the outer body defines a two-lobed epitrochoid, and in which the rotor or inner body has three apex portions and is generally triangular in cross section but has curved or arcuate sides.

It is not intended that the invention be limited, however, to the form in which the inner surface of the outer body approximates a two-lobed epitrochoid and the inner body or rotor has only three apex portions. In other embodiments of the invention the inner surface of the outer body may have a different plural number of lobes with a rotor having one more apex portion than the inner surface of the outer body has lobes.

In rotary mechanisms of the type under consideration, it is the practice to journal the inner member on an eccentric portion of a power shaft or crankshaft. There is a bore in each end wall of the outer body in which a power shaft or crankshaft is mounted. The bearings between the rotor or inner member and the shaft eccentric and the shaft bearings are supplied with lubricating oil under pressure. The bore in each end wall is provided with an annular gutter or groove in which oil from the bearings collects and from which it drains to a suitable pump. The inner member or rotor is provided with an oil sealing means which serves to minimize the passage of oil into the working chambers. The oil sealing means is located on each side of the inner member and is in oil sealing contact with the adjacent end faces of the end walls of the outer body or member. The oil seal is a very important part of the rotary mechanism since too much oil consumption is costly and produces smoke and deposits while too little oil consumption results in excessive wear and poor seal life.

During operation of the rotary mechanism the inner member has an eccentric or orbital movement. This movement subjects the oil seal to varying amounts of centrifugal force during the course of a single revolution. The oil seal is also subjected to temperature variations as the working chambers go through their working phases. These varying amounts of centrifugal force taken in conjunction with the varying temperatures to which the oil seal and outer body are subjected, when the mechanism is used as a rotary engine, tends to cause distortions so that the oil sealing surface of the conventional circular seal may no longer be in flat oil sealing contacts with the end walls of the outer body. If this should happen undesirable leakage of the lubricating oil past the oil seal would result.

It would seem that one solution to the oil sealing problem in such engines would be to provide a plurality of seals in engagement with the end wall of the outer body. However, this procedure does not solve the oil sealing problem. The reason for this failure is that oil which leaks past the first seal will, since it is a non-compressible fluid, build-up a pressure head between the seals resulting in the oil being forced past the second seal and into the working chambers. Effective means of venting the oil pressure between sealing elements of a multisealing assembly has not been found previously.

The present invention is particularly adapted for use with rotary mechanisms wherein the oil seal has an eccentric or orbital movement. Oil sealing means are provided in accordance with the present invention which will automatically maintain oil sealing contact with the end wall of the outer body.

Broadly described, the dual oil sealing means of the present invention comprises at least two sealing elements, a radially inner seal and a radially outer seal, which are mounted on the inner member or rotor such that a portion of the inner diameter seal will extend radially inwardly of the bore in the adjacent end wall of the outer member or housing so that the inertia force which is developed on the oil which accumulates intermediate the inner and outer diameter seals will force the oil into the annular gutter or grooves. This form of the invention has several preferred embodiments, none of which are restrictive of the present invention.

In accordance with the present invention an oil seal element is provided which can be used effectively as a single seal or which can be used in the dual oil seal concept of the present invention which leads to novel, beneficial and unexpected results.

In view of the foregoing it is an object of the present invention to provide novel oil sealing means for effectively sealing the rotary mechanism from oil leakage.

Another object of the present invention is to provide a novel and improved oil sealing means which automatically maintains oil sealing contact with the adjacent end wall of the outer body.

Another object of the present invention is to provide an oil sealing means where rubber-like and metallic materials are used effectively.

A further object of the present invention is to provide a dual oil sealing means having novel venting means for use in rotary mechanisms.

A further object of the present invention is to provide a dual oil sealing means having a novel venting means which directs oil into an annular gutter.

A still further object of the present invention is to provide a dual oil sealing means which uses inertia force to minimize oil leakage in rotary mechanisms.

Another object of the present invention is to provide a dual oil sealing means which can adapt itself to variations in its associated end wall.

A further object of the present invention is to provide a dual oil sealing means which can adapt itself to variations in its associated end wall and which will position the rotor between the outer body end walls.

An object of this invention is to provide a dual oil sealing means for use with a rotary mechanism having an inner member and an outer member wherein the dual oil sealing means comprises a plurality of oil seals and wherein one of the oil seals is mounted on the inner member such that at least a portion of the one oil seal is radially inwardly of a bore in the outer member.

Another object of this invention is to provide a dual oil sealing means for use with a rotary mechanism having an inner member and an outer member wherein the dual oil sealing means comprises a plurality of radially-spaced oil seals mounted on the inner member and wherein a portion of the inner oil seal is disposed radially inwardly of a bore in the outer member and is more rigid than the other seals.

A still further object of this invention is to provide a novel and improved oil sealing means for use with rotary mechanisms having an inner member and an outer member wherein the oil sealing means preferably is mounted on the inner member for axial movement with respect to the inner member.

A still further object of this invention is to provide a novel and improved oil sealing means for use with rotary mechanisms having an inner member and an outer member wherein the oil sealing means is mounted on the inner member for axial movement with respect to the inner member and wherein resilient means are provided for biasing the sealing means towards the outer member.

Another object of the present invention is to provide a dual oil sealing means for use in rotary mechanisms having an inner member and an outer member wherein the dual oil sealing means comprises at least two oil seals each having a base and a leg portion for sealing engagement with the outer member extending radially inwardly of the base portion.

Another object of the present invention is to provide a dual oil sealing means for use in rotary mechanisms having an inner member and an outer member wherein the dual oil sealing means comprises at least two oil seals each having base portions which are fixedly engaged with one another and which are in engagement with the inner member and each having a sealing portion for sealing engagement with the outer member extending radially inwardly of the base portions.

Another object of the present invention is to provide a dual oil sealing means for use in rotary mechanisms having an inner member and an outer member wherein the dual oil sealing means comprises at least two oil seals having a substantially rectangular cross section wherein the oil seals are mounted for axial movement towards the outer member.

A further object of the present invention is to provide a novel single oil seal for use in rotary mechanisms.

Another object of the present invention is to provide a novel single oil seal for use in rotary mechanisms having an inner member wherein the seal can adapt itself to variations in the end wall of the outer member.

Another object of the present invention is to provide a novel single oil seal for use in rotary mechanisms having an inner member wherein the oil seal can adapt itself to variations in the end wall of the outer member through effective use of rubber-like and metallic materials.

Another object of the present invention is to provide a novel and improved single oil seal for use in rotary mechanisms having an inner member and an outer member wherein the single seal has a base portion cooperating with the inner member and has an axially flexible portion extending generally radially of the base portion into sealing engagement with the outer member.

Another object of the present invention is to provide a novel and improved single oil seal for use in rotary mechanisms having an inner member and an outer member wherein the single seal has a base portion carried by the inner member and a sealing portion extending radially inwardly of the base portion in sealing engagement with the outer member.

Another object of the present invention is to provide a single oil seal for use in rotary mechanisms having an inner member and an outer member wherein the single seal has a base portion axially movable with respect to the inner member and a sealing portion extending radially inwardly of the base portion in sealing engagement with the outer member.

Still another object of this invention is to provide a novel single oil seal for use in rotary mechanisms wherein the oil seal includes a portion of rubber-like material.

A still further object of the instant invention is to provide a novel single oil seal for use in rotary mechanisms having an inner member and an outer member wherein the oil seal is constructed of rubber and has a metallic supporting and biasing means for insuring sealing contact of the seal with the outer member.

Additional objects and advantages of the invention will be set forth in the description which follows, and in part will be obvious from the description, or may be learned by practice of the invention, the objects and advantages being realized and attained by means of the instrumentalities and combinations particularly pointed out in the appended claims.

To achieve the foregoing objects, and in accordance with its purpose, the present invention provides in one form dual oil sealing means and in another form provides a single oil sealing means.

Broadly speaking, in accordance with one form of the present invention, a dual oil sealing means is mounted on the rotor, the dual oil sealing means comprising a radially inner seal and a radially outer seal. The radially inner seal is located on the rotor in a position whereby during the rotative movement of the rotor some portion of the radially inner sealing means is located radially inwardly of the bore through the adjacent housing end wall. In this manner the space between the radially inner seal and the radially outer seal is continuously vented to the bore in the adjacent end wall. As a result of this construction, for reasons to be given more fully subsequently, what may be termed a rotary pump is formed whereby oil which accumulates between the radially inner seal and the radially outer seal will be forced into the gutter or annulus.

Briefly described another form of the invention comprises a single oil seal which in one embodiment has a base portion which cooperates with the inner member or rotor and a flexible leg having sealing means at its free end which can adapt itself to variations in the adjacent end wall of the outer member or housing. This form of the invention can be used in the dual oil sealing means form of the invention or can be used as a single oil sealing means.

In another form of the single oil seal invention a seal is provided of rubber which has a metallic spring member embedded therein for biasing the sealing surface towards the adjacent end wall of the outer member or housing.

The accompanying drawings, which are incorporated in and constitute a part of this specification, illustrate several embodiments of the invention and together with the description, serve to explain the principles of the invention.

Of the drawings:

FIGURES 6, 7 and 8 are partial views each showing modifications in the manner in which two single seals may be combined to form a dual oil sealing means.

FIGURE 9 is a partial view showing a modification of the dual oil seal wherein the dual oil sealing means comprises one main part with two sealing surfaces thereon.

FIGURE 10 is a partial view showing another embodiment of the dual oil sealing means wherein the sealing means comprises two substantially circular sealing elements having a rectangular cross section.

The invention consists in the novel parts, constructions, arrangements, combinations and improvements shown and described.

It is to be understood that both the foregoing general description and the following detailed description are exemplary but are not restrictive of the invention.

Reference will now be made in detail to the present preferred embodiment of the invention, an example of which is illustrated in the accompanying drawings.

Figure 1:
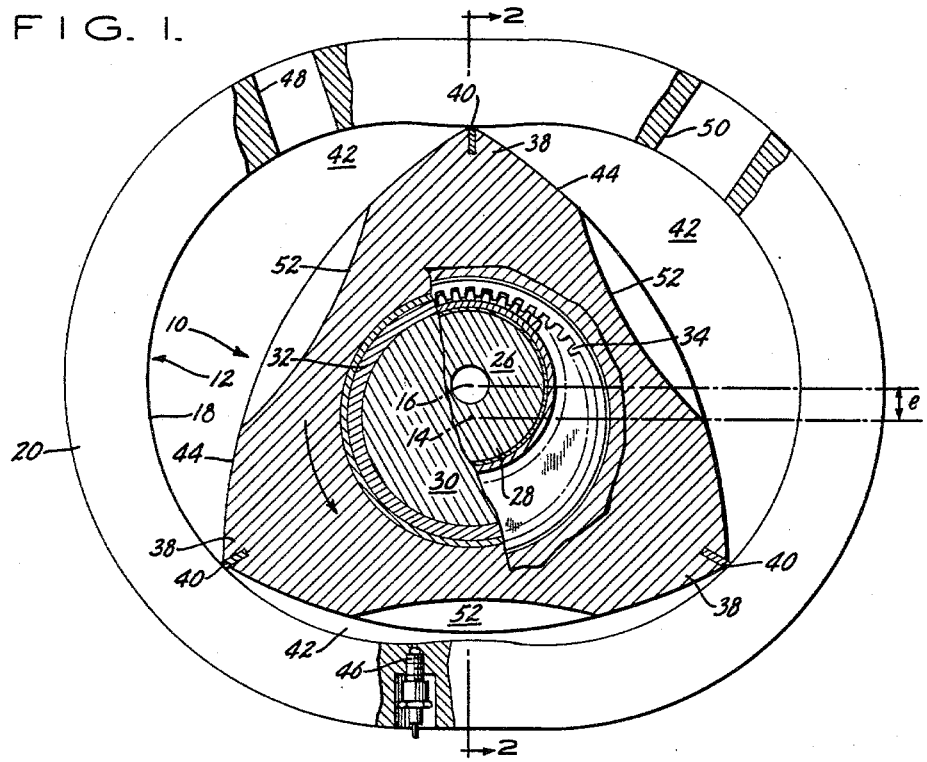
FIGURE 1 is a side elevation of the mechanism with the end wall of the outer body removed and with portions of the rotor and the outer body shown partially in section.
Figure 2:
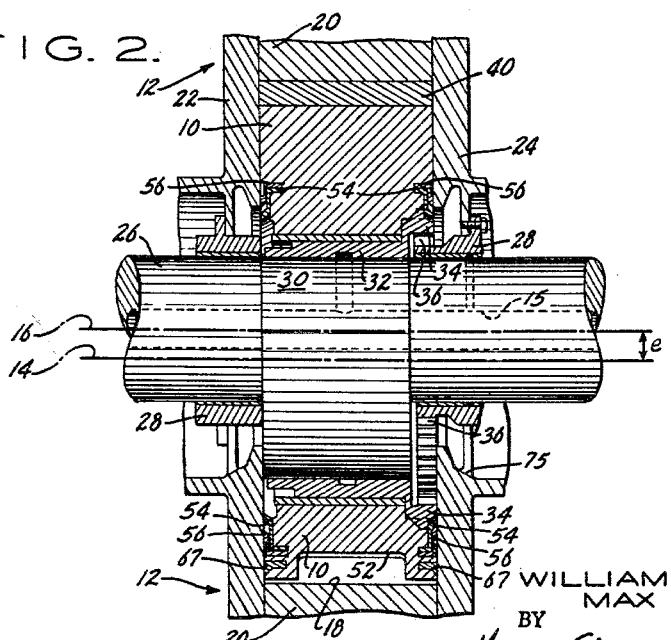
FIGURE 2 is a central vertical section of the mechanism taken along line 2—2 of FIGURE 1 in which the rotor and outer body are shown in section and the crankshaft and eccentric are shown without section.

As embodied, and as shown in FIGURES 1 and 2, the present preferred embodiment includes a rotating combustion engine comprising a generally triangular inner body or rotor 10 having arcuate sides which is eccentrically supported for rotation within an outer member or body 12.

Although in the illustrative embodiment shown in the drawings the outer body 12 is fixed or stationary, a practical and useful form of the invention may be constructed in which both the outer body and rotor are rotary, but the eccentric is stationary; in this latter form of the invention, the power shaft is driven directly by rotation of the outer body and the inner body or rotor rotates relative to the outer body.

As shown in FIGURES 1 and 2 and as here preferably embodied, the rotor 10 rotates on an axis 14 which is eccentric from and parallel to the axis 16 of the curved inner surface of the outer body 12. The distance between the axes 14 and 16 is equal to the eccentricity of the engine and is designated $e$ in the drawings. The curved inner surface 18 of the outer body 12 has basically the form of an epitrochoid in geometric shape and as illustrated includes two arched lobe-defining portions or lobes.

As embodied, the generally triangular shape of the rotor 10 corresponds in its configuration to the "inner envelope" or the maximum profile of the rotor which will permit interference-free rotation of the rotor 10 within the outer body 12.

In the form of the invention illustrated, the outer body 12 comprises a peripheral wall 20 which has for its inner surface the curved inner surface 18, and a pair of axially-spaced end walls 22 and 24 which are disposed on opposite sides of the peripheral wall 20.

The end walls 22 and 24 support a shaft 26, the geometric center of which is coincident with the axis 16 of the outer body 12. This shaft 26 is supported for rotation by the end walls 22 and 24 on large and ample bearings 28. A shaft eccentric 30 is rigidly attached to or forms an integral part of the shaft 26, and the rotor 10 is supported for rotation or rotatively mounted upon the shaft eccentric 30 by a rotor bearing 32 which is fixed to the rotor.

Figure 5:
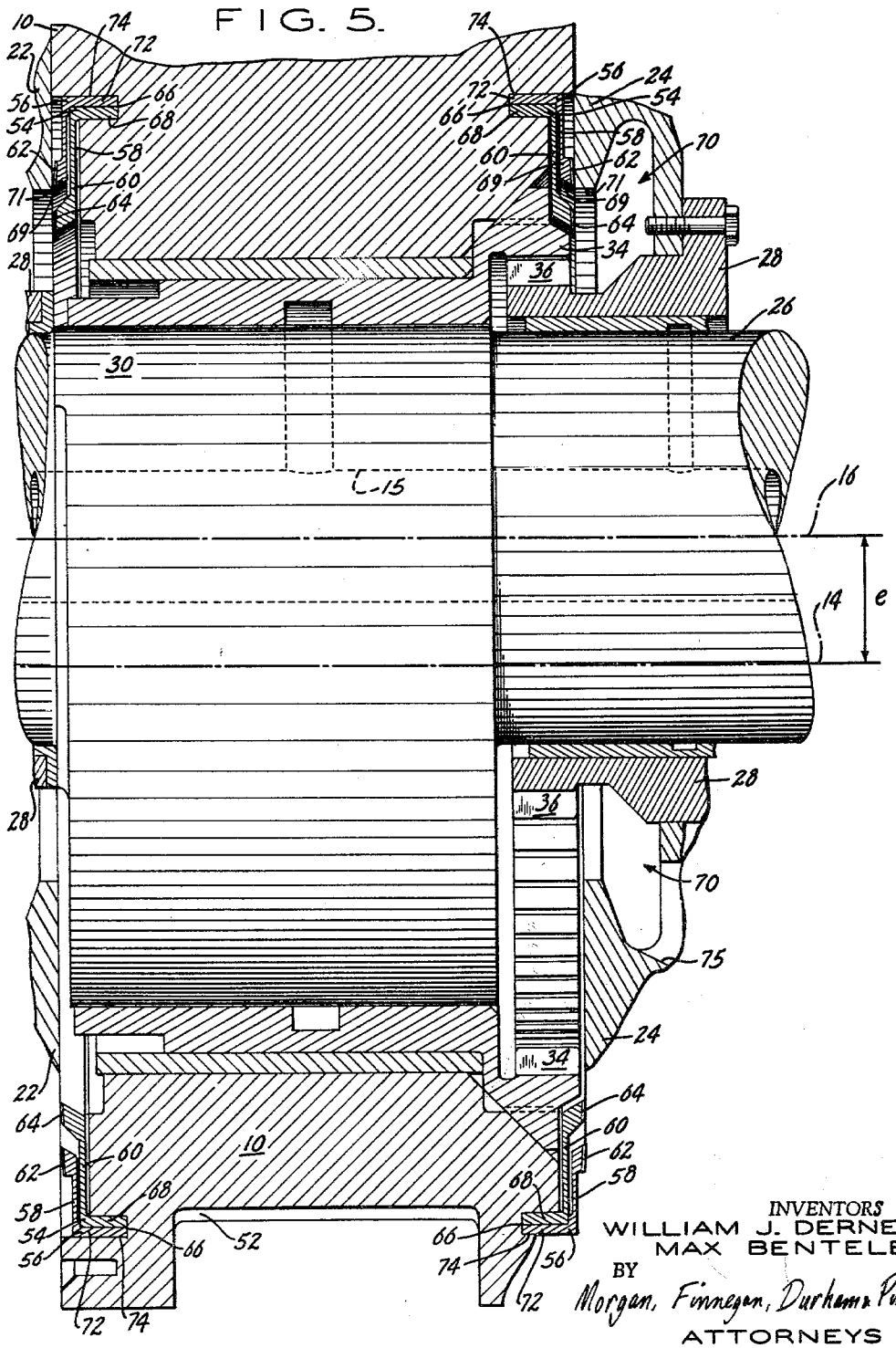
FIGURE 5 is an enlarged view similar to FIGURE 2 showing a preferred embodiment of the dual oil sealing means.

As shown in FIGURES 2 and 5 the bearing surface between the rotor and the shaft eccentric 30 and the shaft bearings 28 are supplied with lubricating oil through the shaft passage 15. Alternatively, the shaft bearings 28 could be supplied with oil through passages (not shown) in the end walls 22, 24. During engine operation oil from the bearings collects in the annular gutter or groove 70 from which it drains through openings 75 to a suitable sump (not shown). Some oil will also tend to flow outwardly along the surfaces of the end walls 22 and 24 facing the rotor 10. The present invention is directed to an oil seal construction which minimizes the oil flow along the end walls 22, 24.

As shown in FIGURES 1, 2 and 5, an internally-toothed or ring gear 34 is rigidly attached to one end face of the rotor 10. The ring gear 34 is in mesh with an externally-toothed gear or pinion 36 which is rigidly attached to the stationary end wall 22 of the outer body 12.

From this construction, it may be observed that the gearing 34 and 36 does not drive or impart torque to the shaft 26 but merely serves to index or register the position of the rotor 10 with respect to the outer body 12 as the rotor rotates relative to the outer body and removes the positioning load which would otherwise be placed upon the apex portions of the rotor 10.

As shown most clearly in FIGURE 1, the rotor 10 includes three apex portions 38 which carry radially movable sealing members 40. The sealing members 40 are in substantially continuous gas-sealing engagement with the inner surface 18 of the outer body 12 as the rotor 10 rotates within and relative to the outer body 12. The end walls of the rotor have mounted therein gas-sealing means 67 so that by means of the rotation of the rotor 10 relative to the outer body 12, three variable volume working chambers 42 are formed between the peripheral working faces 44 of the rotor 10 and the inner surface 18 of the outer body 12. As embodied in FIGURE 1, the rotation of the rotor relative to the outer body is counterclockwise and is so indicated by an arrow.

A spark plug 46 is mounted in the peripheral wall 20 of the outer body 12, and at the appropriate time in the engine cycle, the spark plug 46 provides ignition for a compressed combustible mixture which, on expansion, drives the rotor in the direction of the arrow.

Also as shown in FIGURE 1, one lobe of the epitrochoidal surface 18 is provided with an intake port 48, and the other lobe is provided with an exhaust port 50. As the rotor 10 rotates, a fresh charge is drawn into the working chambers 42 through the intake port 48. This charge is then successively compressed, ignited, expanded, and finally exhausted through the exhaust port 50.

All four successive phases of the engine cycle: intake, compression, expansion, and exhaust, take place within each one of the variable volume working chambers 42 each time the rotor 10 completes one revolution within the outer body, and for each revolution of the rotor, the engine completes a cycle.

The working faces 44 of the rotor 10 are provided with cut-out portions or channels 52 which permit combustion gases to pass freely from one lobe of the epitrochoidal inner surface 18 to the other lobe, when the rotor is at or near the top dead center compression position. Also, the compression ratio of the engine may be controlled by adjusting the volume of the channels 52.

Since the gear ratio between the rotor ring gear 34 and the outer body gear or pinion 36 is 3:2, each time the rotor 10 completes one revolution about its own axis 14, the shaft 26 rotates three times about its axis 16.

As mentioned previously, the instant invention is primarily directed to a novel oil sealing means for preventing leakage of oil into the working chambers. In accordance with the present invention, as herein embodied, a dual oil sealing means is provided with a venting means which leads to new, unexpected and beneficial results.

Reference is now made to FIGURE 5. As therein embodied, the dual oil seal means comprises a radially outer oil seal 56 and a radially inner oil seal 54 carried by the rotor adjacent to its inner periphery. The oil seals are mounted on the rotor so that they are co-axial with the rotor and the outer seal 56 is in constant engagement with the adjacent end wall of the outer body 12. The inner seal 54 is located radially inwardly of the outer seal so that a portion of the seal face of this seal will always be located radially inwardly of the bore 71 in the adjacent end walls 22, 24 of the outer body which is co-axial with the outer body axis 16. With this seal arrangement in the rotary mechanism described a crescent shaped opening 73 (see FIGURES 3–4) is provided through which the space or cavity 69 between the seals 54, 56 is vented to the adjacent end wall bore 71 and to the annular gutter or groove 70 (see FIGURE 5). It will be apparent that the crescent shaped opening 73 is always on the side of the outer body axis 16 diametrically opposite to the rotor axis 14 throughout the relative planetary motion of the rotor 10 with respect to the outer body 12. With respect to a particular rotary mechanism it has been found to be satisfactory if approximately a 30° portion of the inner oil seal 54 is not in engagement with the housing end wall. However, the invention is obviously not limited to that particular amount of non-engagement.

Figure 3:
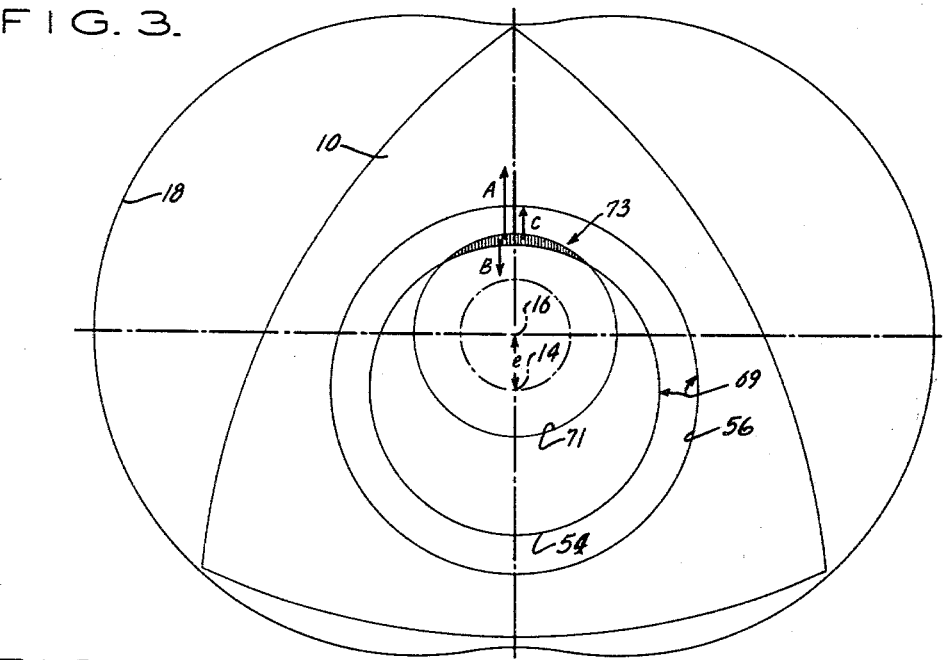
FIGURES 3 and 4 are schematic views illustrating the principle of the dual oil sealing means.
Figure 4:
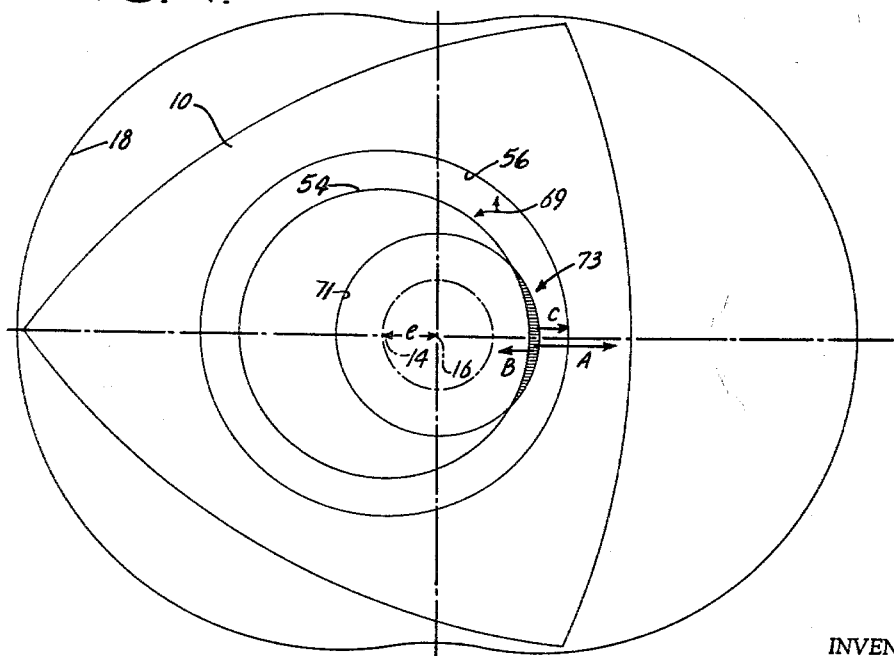

Before considering additional detailed features of the present invention, reference is now made to FIGURES 3 and 4 which schematically illustrate the principle of the dual oil seal invention.

Oil which is within the cavity 69 (FIGURE 5) between the outer seal 54 and the inner seal 56 moves substantially with the rotor 10 and will, therefore, have an acceleration which is substantially the same as a point on the rotor. It will be understood that the rotor 10 has an orbital movement and rotates about two centers, that is the center 14 of the rotor and the center 16 of the shaft 26. The acceleration of a point on the rotor will equal the vector sum of the acceleration of the center of the rotor plus the acceleration of the point on the rotor relative to the center of the rotor. Acceleration of a point on a rotating body is equal to the square of the angular speed of the body times the distance from the center of rotation of the body to the point on the body.

As illustrated in FIGURES 3 and 4 any oil in the space 69 between the two seals 54 and 56 adjacent to said crescent shaped vent opening 73 will have a resultant acceleration C equal to the vector sum of an acceleration component A, directed outward from the opening 73 and substantially equal in direction and magnitude to the acceleration of the rotor axis 14 about the shaft axis 16, and an acceleration component B directed radially inward from the opening 73 toward the rotor axis 14 and substantially equal in magnitude to the acceleration relative to the rotor axis of a point on the rotor adjacent to the vent opening 73. As already stated, the crescent shaped vent opening 73 uncovered by the inner seal 54 is always diametrically opposite to the axis 14 of the rotor 10 with respect to the axis 16 of the shaft 26. It will be apparent, therefore, that the acceleration component A of any oil in the space 69 between the seals 54 and 56 at the crescent shaped vent opening 73 will always be radially outward and the acceleration component B will always be radially inward relative to the axis 16. Also because the shaft rotates three times as fast as the rotor the outward acceleration component A is considerably larger than the inward acceleration component B and therefore the resultant acceleration C is directed radially outwardly. Hence, the inertia forces on the oil between the seals 54 and 56 adjacent to the vent opening 73 will be directed radially inwardly, that is, in a direction opposite to its acceleration C. It follows, therefore, that oil will be pumped out of the space between the seals 54 and 56 through the vent opening 73 between said seals by the inertia forces on the oil. This oil is ejected radially inwardly and axially through the vent opening 73 between the seals 54 and 56 into the bore 71 in the adjacent end wall where it collects in the annular groove 70 and from which it drains through openings 75 to a suitable sump (not shown).

FIGURES 3 and 4 represent different angular positions of the rotor and each figure shows the position of the crescent shaped opening 73. Study of these figures will illustrate that the accumulated oil will be continuously directed into the bore 70.

Reference is now made to FIGURES 5–11 wherein several preferred embodiments of the present invention are illustrated. It will be recognized by those skilled in the art that use of a particular type or shape of oil seal element is obviously not required to realize the broad principles and advantages of the present invention. But, in order to more fully appraise the field of several practical sealing arrangements, various forms of sealing arrangements are illustrated in the drawings.

It is to be understood, however, that these embodiments of the dual oil sealing means form of the present invention are not intended nor should their presence be construed as restricting the scope of the present invention. Since several of these embodiments incorporate similar or identical elements, common reference numerals have been used to designate common features of this invention. Moreover, since several of the dual oil sealing means embodiments of the present invention utilize a novel and useful single oil sealing element, only a broad general description of the single oil seal will be given when describing the dual oil sealing means form of the present invention. It is to be understood that the novel, unusual and beneficial results achieved when using the single seal elements will also be achieved when the single oil seal element is incorporated in the dual oil sealing means.

In accordance with this invention dual oil sealing means comprising at least two seals of different rigidity are provided wherein the relatively rigid radially inner seal serves to guide or position the rotor relative to the end walls and provides what may be termed a rough sealing effect and the more flexible radially outer seal provides what may be termed a fine sealing effect.

As herein embodied in FIGURES 5–8, the oil sealing means 54, 56 of the present invention comprises radially-inwardly-extending annular legs 60 and 58 respectively which are axially flexible to insure contact with the adjacent end walls 22 or 24. However, the sealing leg 58 of the outer seal 56 is more flexible than the sealing leg 60 of the inner seal 54 and, therefore, will adapt itself more readily to variations in the end wall of the outer body which, for example, may be caused by manufacturing tolerances and thermal distortions than will the stiffer sealing leg 60 of the inner seal 54. The stiffer inner seal 54 has the additional advantage in that it serves to position the rotor 10 between the end walls 22 and 24. This is particularly desirable since the inner seal operates with oil on both sides.

In accordance with this invention means are provided on the sealing legs for removing excess oil which may accumulate on the inner face of the end wall of the outer body or member.

This means, as embodied herein, comprises hard, wear-resistant scraper-sealing surfaces 62, 64 on the sealing legs 58 and 60 respectively. By reason of the scraper-sealing surfaces 62, 64, an effective sealing surface is provided which will minimize oil leakage past the sealing means.

The present invention contemplates that two flexible oil sealing elements may be combined to form a dual oil sealing means. Several preferred embodiments will now be discussed.

As embodied in FIGURE 5 the inner seal 54 and the outer seal 56 have bases 68 and 72 respectively. The bases 68, 72 have abutting cylindrical surfaces 66 which surfaces are joined together by some suitable joining material such as, for example, an epoxy resin. The bases 68, 72 are attached to the rotor by providing slot or recess means 74 in the rotor 10 in which the bases 68, 72 can be assembled with a frictionally tight fit.

In accordance with this invention the dual oil sealing means may have means for permitting them to move axially of the inner member or rotor to which they are assembled to help insure effective sealing contact of the dual oil sealing means with the outer member.

Figure 6:
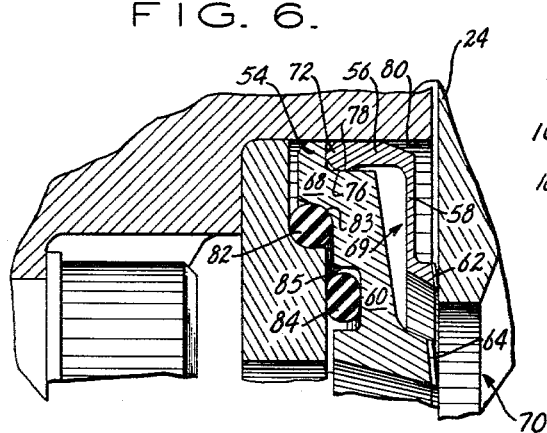
Figure 7:
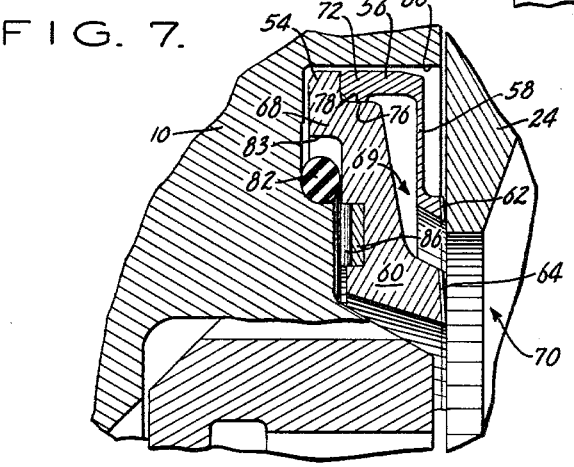

As embodied herein in FIGURES 6, 7 and 8 an outer diameter seal 56 and an inner diameter seal 54 are provided. In the embodiments shown in FIGURES 6, 7 and 8, the inner diameter seal 54 has in its base 68 a recess 76 within which the base 72 of the inner seal 56 is tightly received. If desired the bases of the two seals may be further secured together by screw means not shown. The outer diameter seal 56 and the inner diameter seal 54 are mounted in a recess 80 in the rotor having a size sufficient to permit axial movement of the dual oil seal means towards the end face of the outer member 12.

In each of the embodiments shown in FIGURES 6, 7 and 8 means are provided for biasing the dual oil sealing means towards the adjacent end face of the outer body. This means comprises in the FIGURE 6 embodiment O rings 82, 84 which are mounted in recesses 83, 85 respectively of the inner diameter seal 54. In this embodiment the O rings 82, 84 will bias the dual sealing means toward the outer body and will also provide a secondary sealing effect, that is O rings 82, 84 also serve to prevent radially outward oil leakage between the inner diameter seal 56 and the rotor 10 and will prevent gas leakage to the oil from the other direction.

FIGURE 7 is similar to FIGURE 6 except that a wave spring 86 is provided in lieu of the lower O ring 84 in the FIGURE 6 embodiment. The FIGURE 7 embodiment, therefore, provides a structure which will effectively and efficiently prevent oil leakage intermediate the inner diameter seal 54 and the rotor 10.

FIGURE 8 shows a modification of the FIGURE 7 embodiment wherein the O ring 82 and wave spring 86 have been moved upwardly with respect to the inner diameter seal. This embodiment, therefore, provides a structure wherein the dual oil sealing means is biased towards the adjacent end wall of the outer body by a force which is applied near the top of the inner diameter seal 54.

In the embodiments just described it will be apparent that the biasing means will insure that the seals 54, 56 are maintained in sealing contact with the outer body end walls. The O ring structure may be metallic or rubber-like material within the scope of this invention. Other and different shapes for the biasing means could be employed which could be bonded to the seal.

As noted previously, the broad principles of the dual oil seal form of the present invention does not require that the flexible diaphragm type of seal be used and, FIGURES 9 and 10 represent preferred embodiments of the dual oil sealing means invention wherein the flexible diaphragm type seal is not used.

In FIGURE 9 the dual oil sealing means comprises a unitary element 90 having a substantially U-shape with sealing faces 92, 94 thereon for sealing engagement with the adjacent end walls of the outer body 12. The rotor is provided with a recess 80 whereby the dual sealing means is maintained in sliding contact with the rotor. An O ring 82 is also provided which serves to bias the unitary element 90 and to provide a secondary sealing as described previously.

In FIGURE 10 there is shown an E-shaped frame 92 which is slidably mounted in a recess 80 in the rotor. Mounted within the arms 94 of the frame 92 are outer 96 and inner 98 sealing rings. The sealing rings have at their ends adjacent the outer member sealing faces 95, 97 respectively. As illustrated, these sealing faces 95 and 97 preferably have a slight taper (for example, approximately 5°) with respect to the adjacent end wall 22 or 24 to scrape oil inwardly along the wall.

As shown in FIGURE 10 the frame 92 is mounted for slidable movement within the recess 80 of the rotor 10 and O ring 100 is provided for biasing the frame and hence the sealing rings 96, 98 towards the adjacent end wall of the outer body. Alternatively, it will be apparent to those skilled in the art that it would not beyond the scope of the present invention to mount the frame 92 in tight frictional engagement in the recess 80 of rotor 10 and provide O rings or equivalent biasing means intermediate the sealing rings 96, 98 and the frame 92.

In accordance with the present invention a novel single seal element is provided which can be readily used in either the dual oil sealing means form of the present invention or as a single seal.

Figure 11:
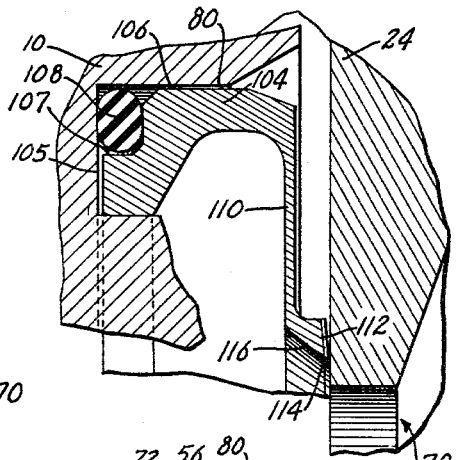
FIGURE 11 is a partial view showing a first embodiment of the single oil seal in accordance with this invention.

As embodied herein, FIGURE 11, a single seal preferably made of metallic material has a base 104 which is loosely received within an annular recess 106 in the rotor to permit axial movement of the seal base 104 relative to the rotor 10. The seal base 104 is provided with a recess 107 in which a resilient seal ring 108 made of either metallic or non-metallic material is placed. As illustrated, the ring 108 is preferaby in the form of an O ring and preferaby is made of rubber-like material.

Extending substantially normal and radially inwardly to the body portion is an axially flexible sealing leg 110. The free end of the leg 110 has an offset scraper and sealing surface 112 having a peripheral edge portion 114. The sealing surface 112 may be made of a hard wear-resistant material such as a chromium alloy or a good bearing material such as ductile iron. The sealing surface 112 preferably is at an angle of approximately 5 degrees with the adjacent end wall such that its inner edge 114 contacts said wall.

As described hereinbefore, an oil seal which is mounted on the rotor is subjected to varying amounts of distortional forces owing to the eccentric movement of the rotor and to temperature differentials. The net result of these distortional forces may result in an axial movement of the oil seal or a portion thereof away from the adjacent face of the outer member. Poor oil sealing resulted. The above described single oil seal structure provides a seal which leads to new, unobvious and beneficial results.

The sealing leg 110, it can be observed, extends radially inwardly and is relatively thin and narrow providing thereby a thin axially flexible sealing leg. The flexible sealing leg 110 can, therefore, readily adapt itself to variations in the adjacent face of the outer member caused by production tolerances.

The present invention provides a structure wherein the oil pressure will be utilized to maintain the oil seal in tight sealing engagement with the adjacent end face of the outer body. Thus any oil pressure against the flexible leg 110 will hold the seal surface 112 against the adjacent end wall of the outer body. Oil which is scraped off the end wall by the seal 104 ultimately is deflected into the bore 71 and then into the drain annulus 70 by the surface 116.

As already stated the single seal 104 is mounted in a recess of the rotor for axial sliding movement with respect to the rotor. Accordingly the O ring 108 also serves to bias the single seal 104 means towards the adjacent end face of the outer member. The advantage of this structure it will be understood is that the recess need not be made to close manufacturing tolerances and the O ring will insure that the single seal remains in constant sealing contact with the adjacent end face of the outer member regardless of the direction of the resultant distortional forces.

The single seal, it will be recognized, is a very effective and efficient seal. Also the single seal can be embodied in the dual sealing means and will provide the dual oil sealing means with the attendant advantages of the single seal structure. It will be further recognized that even though the inner diameter seal has a sealing leg with a relatively thick sealing leg that this seal will nevertheless provide to a lesser extent the advantages of the single seal construction. Thus, it will be recalled, that in some embodiments of the present invention a rough and a fine sealing effect is provided.

In accordance with this invention a single seal means having a molded rubber construction is provided which leads to new, unobvious and beneficial results.

Figure 12:
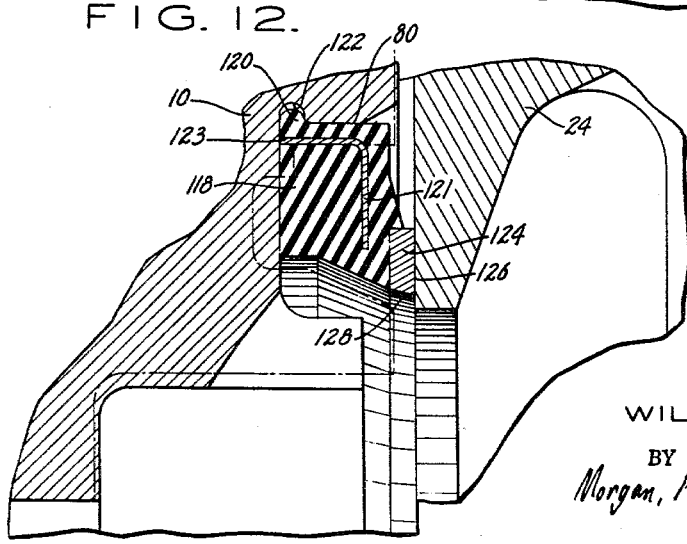
FIGURE 12 shows a modification of the single oil seal in accordance with this invention.

As herein embodied in FIGURE 12 the single seal means has a molded rubber body portion 118 and a semicircular abutment 120 on one corner of the body. The abutment 120 is engaged in an annular recess 122 cooperating with the recess 80 of the rotor 10. It will be clear that the use of the abutment 120 is optional but when it is used, serves to retain the seal body 118 within the recess 80. Located diagonally with respect to the abutment 120 there is a scraper-body 124 having a scraper sealing surface 126 which is attached to or embedded in the molded upper body 118 in any suitable manner.

It will be understood that the sealing surface 126 may also be located so that it normally forms a small angle, e.g., five degrees, with the adjacent face of the outer member. The molded rubber construction of the single seal element has the advantages that it is simple and easy to manufacture. The molded rubber, owing to its inherent resiliency will elastically urge the sealing surface 126 into sealing contact with the adjacent end wall of the outer body.

However, in accordance with this invention additional elastic supporting means may be provided for insuring oil sealing contact between the seal and the adjacent end wall of the outer body.

As embodied herein the additional supporting means comprises a preferably metallic L-shaped supporting member 123 which is embedded in the seal body 118. The supporting member 123 has an inwardly-directed axially-flexible leg 21 which will bias the scraper-sealing element 124 towards the adjacent end face of the outer body. In this way the sealing surface 126 is always maintained in sealing engagement with the adjacent end face of the outer member despite thermal and centrifugal distorting forces on the oil seal and in spite of variations in the adjacent face of the outer member.

It will be understood that, although not shown in the drawings, the single molded rubber seal could be used in the dual oil sealing means form of the present invention.

The seal rings of FIGURES 6, 7, 8, 11 and 12 all comprise a seal having an axially flexible leg, preferaby metallic, which extends radially between the rotor 10 and the adjacent end wall 22 or 24 of the outer body 12. In addition, these seals include a body preferably of rubber-like material which provides a seal between the seal ring and the inner body 10 and also urges the seal ring axially into sealing engagement with said end wall. The different spring rates provided by the metallic and rubber-like portions of such seals makes it possible to provide a seal with a wide operating range of temperature, seal deflection and/or seal clearance and in addition, provides better protection against excessive loads on the seals. Also in the case of FIGURE 12, because the seal scraper face is relatively thin and flexible and is supported in rubber-like material, and because the metallic spring 121 is embedded in rubber, the scraper face of the seal can more readily conform to the surface of the end wall engaged by said face.

The invention in its broader aspects is not limited to the specific mechanisms shown and described but also includes within the scope of the accompanying claims any departures made from such mechanisms which do not sacrifice its chief advantages.

What we claim is:

1. A rotary mechanism comprising an outer body having spaced end walls and a peripheral wall interconnecting said end walls to define, between said walls, a cavity having an axis along which said end walls are spaced; an inner body received within said outer body cavity and supported for relative rotation with respect to said outer body, said inner body having end faces disposed adjacent to said outer body end walls and having a peripheral surface cooperating with the peripheral wall of the outer body to define a plurality of working chambers therebetween; an annular gutter in said end walls, recess means in said end faces of said rotor, a pair of seal rings mounted in said recess means for sealing engagement with the adjacent end wall, said seal rings having their end-wall-engaging seal faces radially spaced and disposed adjacent to the inner periphery of said end face to form a space therebetween, the radially outer of said seal rings being in continuous sealing engagement with the adjacent end wall and the radially inner of said seal rings being disposed so that it always has a portion of its end-wall-engaging seal face disposed radially inwardly of a bore in the adjacent end wall with the remainder of said inner seal ring being disposed radially outwardly of said bore and in sealing engagement with the adjacent end wall to provide continuous communication between said space and said annular gutter.

2. A rotary mechanism as claimed in claim 1 and including rubber-like means associated with one of said seal rings to provide a seal between the ring and the inner body and to urge said ring toward the adjacent end wall.

3. A rotary mechanism as claimed in claim 1 and in which each of said seal rings has an axially-flexible annular portion extending generally radially between the inner body and adjacent end wall and having one end carried by the inner body and having a seal face at its other end for sealing engagement with the adjacent end wall.

4. A rotary mechanism comprising a hollow outer body having an axis; axially-spaced end walls, and a peripheral wall interconnecting the end walls, a rotor mounted within the outer body and rotatable relative to the outer body, the rotor having end faces disposed adjacent to the end walls and a plurality of circumferentially-spaced apex portions for sealing engagement with the inner surface of the peripheral wall to form a plurality of working chambers between the rotor and the peripheral wall which vary in volume upon relative rotation of the rotor within the outer body, an annular gutter in said end walls, recess means in said end faces of said rotor, and dual oil sealing means mounted in said recess means, said dual oil sealing means comprising at least two spaced apart sealing faces forming a cavity therebetween and means for discharging oil from said cavity and into said gutter in response to relative rotation between said rotor and said outer body.

5. A rotary mechanism as defined in claim 4 wherein said sealing elements are axially slidable in said recess means.

6. A rotary mechanism as defined in claim 4 wherein said sealing means have base portions located in said recess means and sealing leg means extending radially inwardly from base portions.

7. A rotary mechanism as defined in claim 4 wherein said sealing surfaces are connected by a substantially U-shaped unitary body.

8. A rotary mechanism comprising a hollow outer body having an axis; axially-spaced end walls, and a peripheral wall interconnecting the end walls, a rotor mounted within the outer body on a shaft having an axis eccentric to the axis of the outer body and rotatable relative to the outer body, bearing means mounting said shaft in said outer body and means for directing lubricating oil to said bearings, the rotor having a plurality of circumferentially-spaced apex portions for sealing engagement with the inner surface of the peripheral wall to form a plurality of working chambers between the rotor and the peripheral wall which vary in volume upon rotation of the rotor within the outer body, recess means in said end faces of said rotor, dual oil sealing means axially slidably mounted in said recess for minimizing oil leakage into said working chambers, said dual oil sealing means including at least two sealing elements forming a cavity therebetween, said dual oil sealing means forming a discharge means for discharging oil radially inwardly from said cavity in response to relative rotation between said rotor and said outer body, one of said sealing elements comprising a base portion having a flexible leg means extending therefrom, said leg means having a scraper-sealing surface thereon.

9. A rotary mechanism as defined in claim 8 wherein another of said sealing elements comprises a base portion having flexible leg means extending therefrom and wherein the outer one of said sealing legs is more flexible than the other of said sealing legs.

10. A rotor mechanism comprising a hollow outer body having an axis; axially-spaced end walls, and a peripheral wall interconnecting the end walls, a rotor mounted within the outer body on an axis eccentric to the axis of the outer body and rotatable relative to the outer body, the rotor having end faces disposed adjacent to the end walls and a plurality of circumferentially-spaced apex portions for sealing engagement with the inner surface of the peripheral wall to form a plurality of working chambers between the rotor and the peripheral wall which vary in volume upon relative rotation of the rotor within the outer body, recess means in said end faces of said rotor, oil sealing means mounted in said recess means, said oil sealing means including at least two oil seals which in response to relative rotation of said rotor and said outer body discharges radially inwardly any oil which accumulates between said seals, one of said seals including an axially movable leg means and means having a different spring rate than said leg means for biasing said leg means toward the adjacent end face of the outer body.

11. A rotary mechanism as defined in claim 10 wherein one of said oil seals comprises a body of rubber-like material having a sealing surface thereon.

12. A rotary mechanism as defined in claim 11 wherein said rubber sealing means includes a metallic spring member.

13. A rotary mechanism as defined in claim 10 wherein said seal means is slidably mounted in said recess and a resilient member is provided in said recess.

14. A rotary mechanism comprising a hollow outer body having an axis; axially-spaced end walls having a passage means, and a peripheral wall interconnecting the end walls, a rotor mounted within the outer body and rotatable relative to the outer body, the rotor having end faces disposed adjacent to the end walls and a plurality of circumferentially-spaced apex portions for sealing engagement with the inner surface of the peripheral wall to form a plurality of working chambers between the rotor and the peripheral wall which vary in volume upon relative rotation of the rotor within the outer body, recess means in said end faces of said rotor, and dual oil sealing means mounted in said recess means, said dual oil sealing means comprising at least two spaced apart sealing faces forming a cavity therebetween which is arranged for communication with said passage means whereby upon relative rotation of said rotor and said outer body any oil in said cavity will be subjected to a radially inwardly directed inertia force to discharge the oil from said cavity and into said passage means.

15. A rotary mechanism comprising a hollow outer body having an axis; axially-spaced end walls and a peripheral wall interconnecting the end walls, a rotor mounted within the outer body and rotatable relative to the outer body on a shaft having bearing means for supporting the rotor and bearing means for supporting the shaft in bores in said end walls, passage means for directing lubricating oil to said bearings and gutter means for directing oil to a drain, the rotor having end faces disposed adjacent to the end walls, recess means in said end faces, and dual oil sealing means mounted in said recess means, said dual oil sealing means comprising at least two spaced apart sealing faces forming a cavity therebetween and venting means for discharging oil from said cavity and into said gutter means in response to relative rotation of said rotor and said outer body.

16. A rotary mechanism as defined in claim 15 wherein said sealing means are slidably mounted in said recess means, and resilient means are provided for biasing said sealing means towards said end walls.

17. A rotary mechanism comprising a hollow outer body having an axis; axially-spaced end walls and a peripheral wall interconnecting the end walls, a rotor mounted within the outer body and rotatable relative to the outer body on a shaft having bearing means for supporting the rotor and bearing means for supporting the shaft in bores in said end walls, passage means for directing lubricating oil to said bearings and gutter means for directing oil to a drain, the rotor having end faces disposed adjacent to the end walls, recess means in said end faces, and dual oil sealing means including an inner seal and an outer seal forming a space therebetween mounted in said recess means to provide continuous communication between said space and said bores so that oil in the space between said seals will be subjected to an inertia force upon relative rotation of said rotor and said outer body and will be discharged therefrom.

18. A rotary mechanism comprising in combination a shaft having an eccentric portion; an outer body having end walls axially spaced along said shaft and a peripheral wall interconnecting said end walls to form a cavity therebetween coaxial with said shaft; a rotor received within said cavity and journaled on said shaft eccentric portion so that the axis of the rotor is laterally spaced from but parallel to the axis of said outer body cavity; said rotor having axially-spaced end faces adjacent to said end walls and also having a plurality of circumferentially-spaced apex portions for engagement with the inner surface of said peripheral wall to form a plurality of working chambers between said rotor and peripheral wall which vary in volume upon relative rotation of said rotor and outer body; and first and second ring means coaxially carried at each end face of the rotor adjacent to the rotor inner periphery, each first ring means including resilient means for urging said first ring means into sealing engagement with the adjacent end wall of the outer body and making said first ring means relatively easily deflectable in an axial direction, each second ring means being disposed radially inwardly of its adjacent first ring means and being both relatively stiff against deflection in an axial direction and so dimensioned that said second ring means serves to position the rotor between the end walls of the outer body and to restrain axial movement of said rotor.

References Cited by the Examiner
UNITED STATES PATENTS

| | | | |
|---|---|---|---|
| 1,327,801 | 1/20 | Blache | 288—14 |
| 2,248,385 | 7/41 | Reynolds | 288—14 |
| 2,421,659 | 6/47 | Sutten et al. | 277—207 |
| 2,547,185 | 4/51 | Von Bolhar | 277—207 X |
| 2,605,045 | 7/52 | Strezynski | 285—13 X |
| 2,773,366 | 12/56 | Slaght | 277—207 X |
| 2,857,182 | 10/58 | Bain et al. | 286—11.14 |
| 2,880,045 | 3/59 | Wankel | 123—8 X |
| 2,887,332 | 3/59 | Lazan | 286—11.14 |
| 2,908,521 | 10/59 | Kangas | 277—92 |
| 3,100,647 | 8/63 | Lee et al. | 277—59 |

FOREIGN PATENTS

| | | |
|---|---|---|
| 564,280 | 7/58 | Belgium. |

LAURENCE V. EFNER, *Primary Examiner.*

MORRIS M. FRITZ, ROBERT M. WALKER,
*Examiners.*